US012076872B1

(12) United States Patent
Li

(10) Patent No.: US 12,076,872 B1
(45) Date of Patent: Sep. 3, 2024

(54) MAGNETIC SHAVER

(71) Applicant: Ming Li, Zhejiang (CN)

(72) Inventor: Ming Li, Zhejiang (CN)

(*) Notice: Subject to any disclaimer, the term of this patent is extended or adjusted under 35 U.S.C. 154(b) by 0 days.

(21) Appl. No.: 18/416,831

(22) Filed: Jan. 18, 2024

(51) Int. Cl.
*B26B 19/38* (2006.01)
*B26B 19/14* (2006.01)
*B26B 19/32* (2006.01)

(52) U.S. Cl.
CPC ............ *B26B 19/386* (2013.01); *B26B 19/14* (2013.01); *B26B 19/32* (2013.01); *B26B 19/3846* (2013.01)

(58) Field of Classification Search
None
See application file for complete search history.

(56) References Cited

U.S. PATENT DOCUMENTS 6,226,870 B1 * 5/2001 Barish .................... B26B 19/14 30/34.2
8,533,960 B1 * 9/2013 Barish .................... B26B 19/14 30/43.6
2010/0275446 A1 * 11/2010 Schmitt ................ B26B 19/386 30/43.4

FOREIGN PATENT DOCUMENTS

CN 203245899 U * 10/2013
CN 107756458 A * 3/2018
CN 110340949 A * 10/2019
CN 111941470 A * 11/2020
CN 219006136 U * 5/2023
WO WO-2020037554 A1 * 2/2020
WO WO-2021003213 A1 * 1/2021 ............ B26B 19/14

OTHER PUBLICATIONS

English translstion of CN-2019006136-U, publication date May 12, 2023.*
English translstion of CN-203245899-U, publication date Oct. 23, 2013.*
English tranlstion of WO-2020037554-A1, publication date Feb. 27, 2020.*
English translation of CN-111941470-A, publication date Nov. 17, 2020.*

* cited by examiner

*Primary Examiner* — Hwei-Siu C Payer

(57) ABSTRACT

A magnetic shaver, comprising a connecting part, wherein the connecting part is detachably connected to the device host, and the device host is provided with a control mainboard and a power supply; a bottom shell, wherein the bottom shell is installed on the connecting part; the connecting part and the bottom shell are provided with a gear driving mechanism, and the gear driving mechanism is powered and controlled by the device host; a cutter head assembly, wherein the cutter head assembly is magnetically connected and assembled with the bottom shell through a magnetic structure; when the cutter head assembly is installed on the bottom shell, the gear driving mechanism drives the cutter head assembly. The cutter head assembly and the bottom shell are disassembled and assembled through magnetic attraction, so the cutter head assembly can be easily disassembled and replaced, making the operation more convenient.

6 Claims, 10 Drawing Sheets

MAGNETIC SHAVER

1. TECHNICAL FIELD

The invention relates to a shaver, and in particular to a magnetic shaver.

2. BACKGROUND ART

In personal care and daily life, shavers are one of the most commonly used personal care tools for men, and the optimization of their design and functions has always been a research hotspot in the field of consumer electronics. A traditional shaver usually includes a cutter head assembly and a bottom shell. The cutter head assembly contains the cutter and other structures connected thereto, while the bottom shell includes a handle and a part for mounting the cutter head assembly.

In the prior art, the connection between the cutter head assembly and the bottom shell usually adopts buckles, threaded joints or other similar mechanical connection methods. Although these connection methods can achieve the fixation of the cutter head assembly and the bottom shell, they also have some obvious shortcomings. For example:

traditional mechanical connection methods often require users to exert extra force to disassemble and assemble, which may be inconvenient for users who are unfamiliar with the operation.

Long-term use and repeated disassembly and installation will cause loss and wear of the buckles or threads, thereby reducing the overall service life and stability of the shaver.

The structure of the mechanical connection part is often complicated, which not only increases the difficulty of cleaning, but may also lead to incomplete cleaning, affecting the hygiene and safety of the shaver.

Therefore, the existing technology has certain limitations in the connection method between the cutter head assembly and the bottom shell. There is an urgent need for a new connection method to solve the above problems and improve the convenience, durability and hygienic safety of the shaver.

3. SUMMARY OF THE INVENTION

In order to solve the above problems, the invention provides a magnetic shaver, which adopts a magnetic structure that is easy to open and solves the problem of quick disassembly and assembly of the cutter head assembly. It can not only meet the requirements of quick assembly and disassembly, but also ensure sufficient magnetic strength.

The invention is realized by the following technical solutions: a magnetic shaver, comprising:

- a connecting part, wherein the connecting part is detachably connected to the device host, and the device host is provided with a control mainboard and a power supply;
- a bottom shell, wherein the bottom shell is installed on the connecting part; the connecting part and the bottom shell are provided with a gear driving mechanism, and the gear driving mechanism is powered and controlled by the device host;
- a cutter head assembly, wherein the cutter head assembly is magnetically connected and assembled with the bottom shell through a magnetic structure; when the cutter head assembly is installed on the bottom shell, the gear driving mechanism drives the cutter head assembly;

- magnetic opening and closing members, which are separately arranged on the outer circumferential surface of the cutter head assembly; when it is necessary to remove the cutter head assembly, press the magnetic opening and closing members, or directly manually separate the cutter head assembly.

Preferably, the bottom shell is provided with a docking panel on one side opposite to the cutter head assembly, and the docking panel is provided with a boss corresponding to the position of the cutter head assembly; the drive shafts of the gear driving mechanism all pass through the boss and extend to the outside of the docking panel;

a plurality of first magnetic grooves are arranged annularly on the side of the docking panel away from the cutter head assembly, and each of the first magnetic groove is embedded with a first magnetic block; the docking panel and the bottom shell are assembled with each other.

Preferably, the gear driving mechanism comprises a central driving wheel, transmission gears, and driven gears; the driven gears are circumferentially arranged on a gear bracket provided in the bottom shell; the central driving wheel is installed at the center of the gear bracket, and the central driving wheel is driven by a driving motor; one side of each of the driven gear is driven by meshing with the central driving wheel through the transmission gear, and each of the driven gear and the central driving wheel is provided with a drive shaft; the drive shaft passes through the docking panel and is provided with a drive block, and each of the drive block corresponds to a driving installation port of the cutter head assembly.

Preferably, the cutter head assembly comprises a face shell, fixing panels, cutter nets, cutting blades, elastic brackets, and connecting brackets; the elastic bracket is installed in the face shell and snap-connected to the face shell; the fixing panel is installed on the face shell, and the cutter net is installed on the fixing panel; the cutting blade is arranged corresponding to each cutter net; the bottom of each of the cutting blade is provided with a connecting bracket, and the driving installation port is formed at the bottom of the connecting bracket; after the cutter head assembly is assembled with the bottom shell, the driving block is installed into the driving installation port and drives the cutting blade to perform cutting action;

the elastic bracket is provided with a second magnetic groove corresponding to each of the first magnetic groove, and the second magnetic groove is embedded with a second magnetic block; the first magnetic block is magnetically attracted to the magnetic block on the docking panel, and the elastic brackets of several second magnetic blocks are provided with magnetic opening and closing members.

Preferably, the magnetic opening and closing member passes through the through hole opened in the face shell and extends into the face shell; the elastic bracket is provided with a magnetic positioning hole at the position corresponding to the magnetic opening and closing member, and the magnetic opening and closing member is inserted into the magnetic positioning hole and is arranged corresponding to one side of the magnetic block.

Preferably, each side of the magnetic block relative to the magnetic opening and closing member is provided with a positioning slot, and the magnetic opening and closing member is buckled into the positioning slot.

Preferably, the top of the positioning slot is provided with an inclined guiding surface, and the head of the magnetic opening and closing member is spherical and contacts the inclined guiding surface; a return spring is installed between each of the magnetic block and the second magnetic groove;

the bottom of the return spring is fixedly connected to the bottom surface of the second magnetic groove, the other end of the return spring is fixedly connected to the magnetic block; when the magnetic opening and closing member is pressed, the magnetic block moves toward the side away from the first magnetic block, and at this time the return spring is stretched.

Preferably, the magnetic opening and closing members are provided to be at least three, and the number of the magnetic opening and closing members is smaller than the number of the magnetic blocks; the magnetic opening and closing members are arranged in a triangular shape in the groove opened outside the face shell.

The beneficial effects of the invention are: the magnetic shaver according to the invention adopts an annular magnetic suction structure in the connection method between the cutter head assembly and the bottom shell; by applying magnetic connection, the user can easily separate or connect the cutter head assembly with the bottom shell; especially when disassembling the cutter head assembly, the user only needs to simply press the magnetic opening and closing member provided on the shaver to reduce the strength of the magnetic structure, thereby easily removing the cutter head assembly, which significantly improves the convenience of operation, allowing users to easily disassemble and assemble even without professional knowledge or skills;

although the magnetic strength will be temporarily reduced during the disassembly process, in the connected state, the magnetic connection provides sufficient strength to ensure that the cutter head assembly is stable and does not loosen during use, which ensures the safety and efficiency of the shaving process and improves the user experience;

since the magnetic connection reduces mechanical wear, compared with the traditional mechanical fastening method, the invention significantly improves the durability and reliability of the shaver; this connection method reduces losses caused by repeated disassembly and assembly and extends the service life of the shaver;

the magnetic connection method simplifies the structure of the cutter head assembly and the bottom shell, making cleaning easier and more thorough; the user can easily remove the cutter head assembly for deep cleaning, ensuring the hygiene and safety of the shaver.

4. BRIEF DESCRIPTION OF ACCOMPANY DRAWINGS

In order to explain the technical solutions of the embodiments in the invention more clearly, the drawings that need to be used in the embodiments will be introduced hereinafter. It should be understood that the following drawings only show certain embodiments of the invention, and therefore should not be regarded as limiting the scope. For those of ordinary skill in the art, other drawings may be obtained from these drawings without creative efforts.

1 refers to the cutter net; 2 refers to the fixing panel; 3 refers to the face shell; 4 refers to the bottom shell; 5 refers to the connecting part; 6 refers to the magnetic opening and closing member; 7 refers to the gear bracket; 8 refers to the docking panel; 9 refers to the elastic bracket; 10 refers to the cutting blade; 11 refers to the second magnetic groove; 12 refers to the connecting bracket; 13 refers to the first magnetic groove; 14 refers to the central driving wheel; 15 refers to the transmission gear; 16 refers to the driven gear; 17 refers to the magnetic block; 18 refers to the drive block; 19 refers to the boss; 20 refers to the positioning slot; 21 refers to the inclined guiding surface.

5. SPECIFIC EMBODIMENT OF THE INVENTION

All the features disclosed in the specification, or all disclosed methods or steps in the process, except for mutually exclusive features and/or steps, can be combined in any manner.

Any feature disclosed in the specification (including any appended claims, abstract and drawings), unless specifically stated, can be replaced by other equivalent or equivalent alternative features. That is, unless otherwise stated, each feature is just one example of a series of equivalent or similar features.

Figure 1:
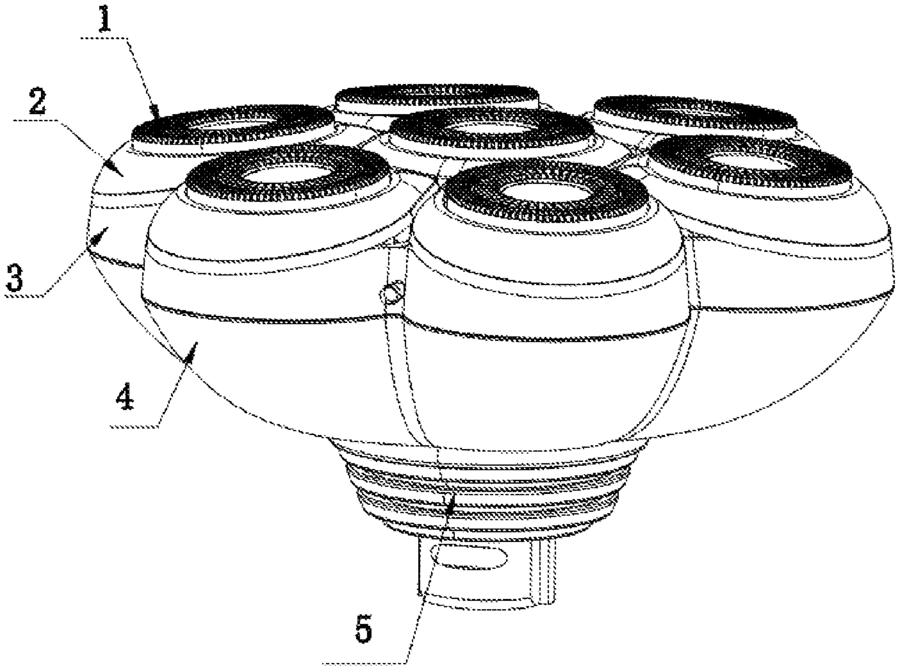
FIG. 1 is a schematic diagram of the overall structure according to the invention.
Figure 6:
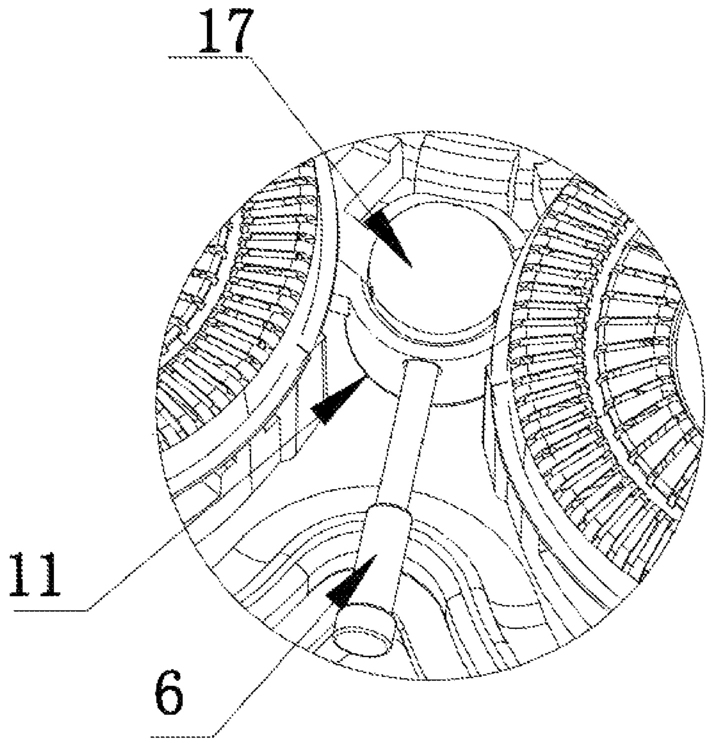
FIG. 6 is a partial enlarged view of the magnetic opening and closing member according to the invention.
Figure 9:
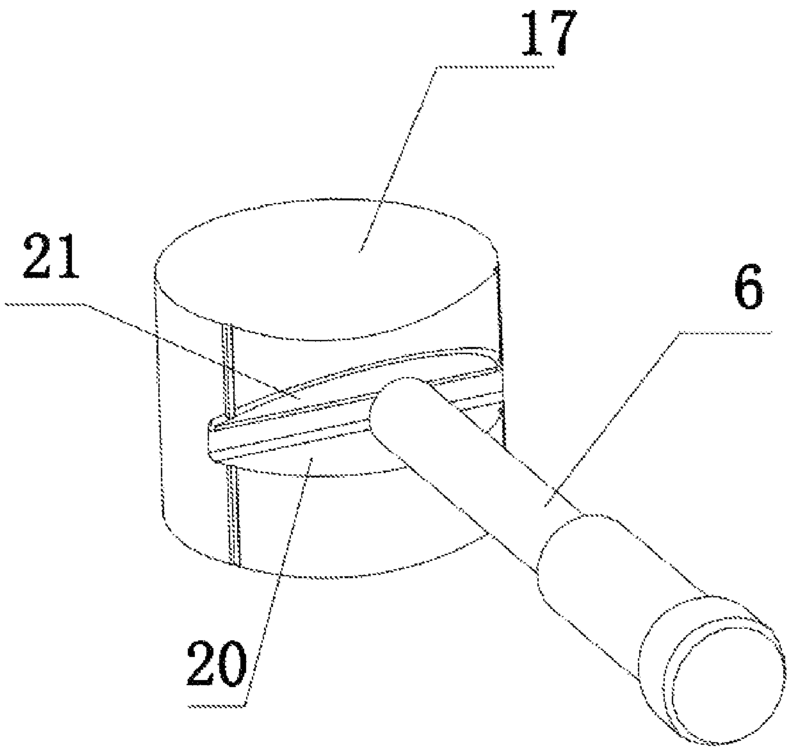
FIG. 9 is a partial enlarged view of the second magnetic block and the magnetic opening and closing member according to the invention.

As shown in FIG. 1, a magnetic shaver according to the invention, comprising: a connecting part 5, wherein the connecting part 5 is detachably connected to the device host, and the device host is provided with a control mainboard and a power supply;

it further comprises a bottom shell 4, wherein the bottom shell 4 is installed on the connecting part 5; the connecting part 5 and the bottom shell 4 are provided with a gear driving mechanism, and the gear driving mechanism is powered and controlled by the device host;

it further comprises a cutter head assembly, wherein the cutter head assembly is magnetically connected and assembled with the bottom shell 4 through a magnetic structure; when the cutter head assembly is installed on the bottom shell 4, the gear driving mechanism drives the cutter head assembly;

as shown in FIGS. 6 and 9, it further comprises magnetic opening and closing members 6, which are separately arranged on the outer circumferential surface of the cutter head assembly; when it is necessary to remove the cutter head assembly, press the magnetic opening and closing members 6, or directly manually separate the cutter head assembly. When disassembling the cutter head assembly, the user does not need to press down the magnetic opening and closing member 6, or the user can use manpower to separate the cutter head assembly from the bottom shell 4. However, when the magnetic opening and closing member 6 is not pressed down, it requires a larger force to remove the cutter head assembly, and then the cutter head assembly can also be separated. Although the cutter head assembly can be forcibly disassembled in this way, it exerts a large force on the cutter head assembly and is not suitable for long-term operation. Therefore, when disassembling the cutter head assembly, manually pressing down the magnetic opening and closing member 6 can reduce the magnetic attraction between the cutter head assembly and the bottom shell 4, making it easier to disassemble the cutter head assembly. Under normal circumstances, the cutter head assembly and the bottom shell 4 have very good magnetic attraction and are not easy to separate.

Figure 3:
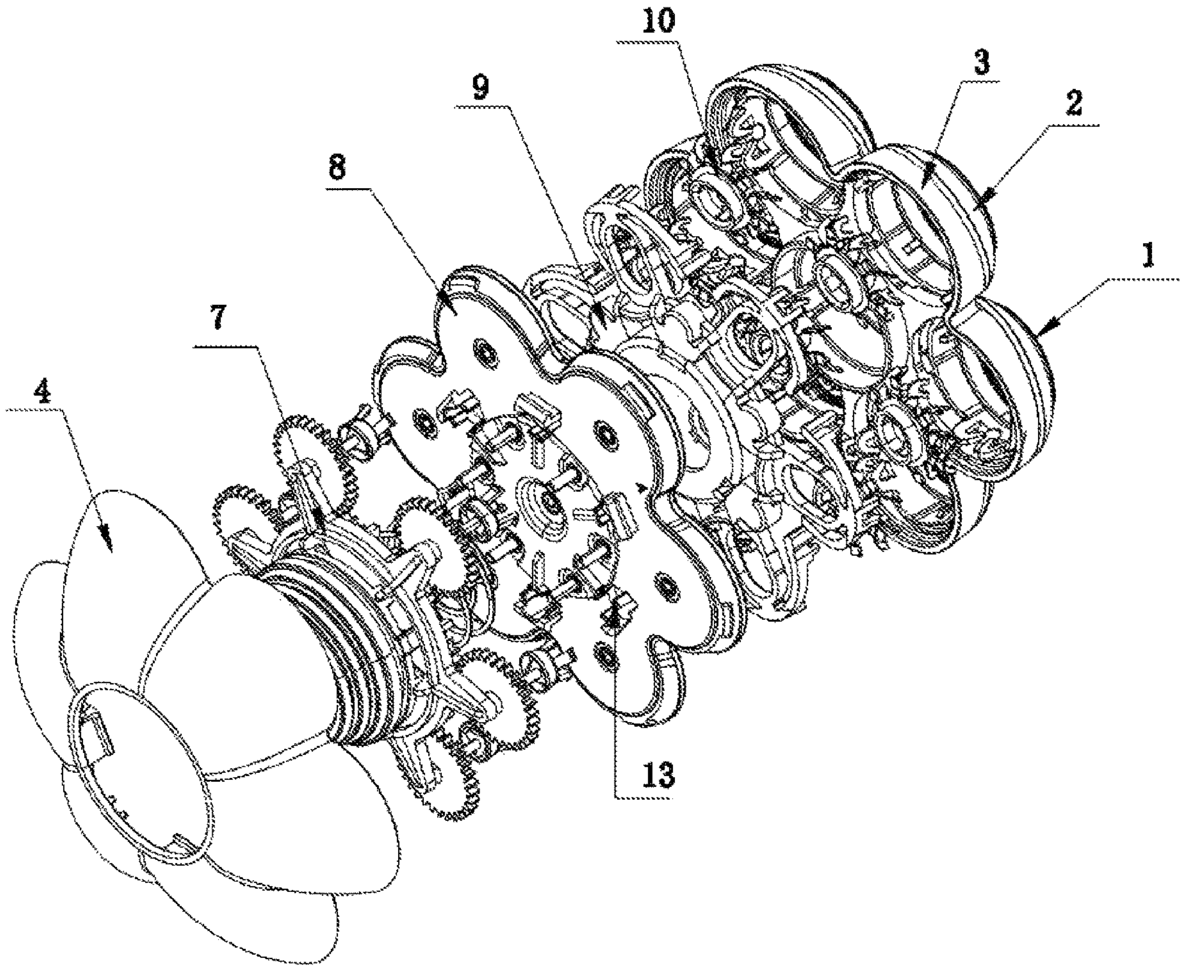
FIG. 3 is a first explosion schematic diagram according to the invention.
Figure 4:
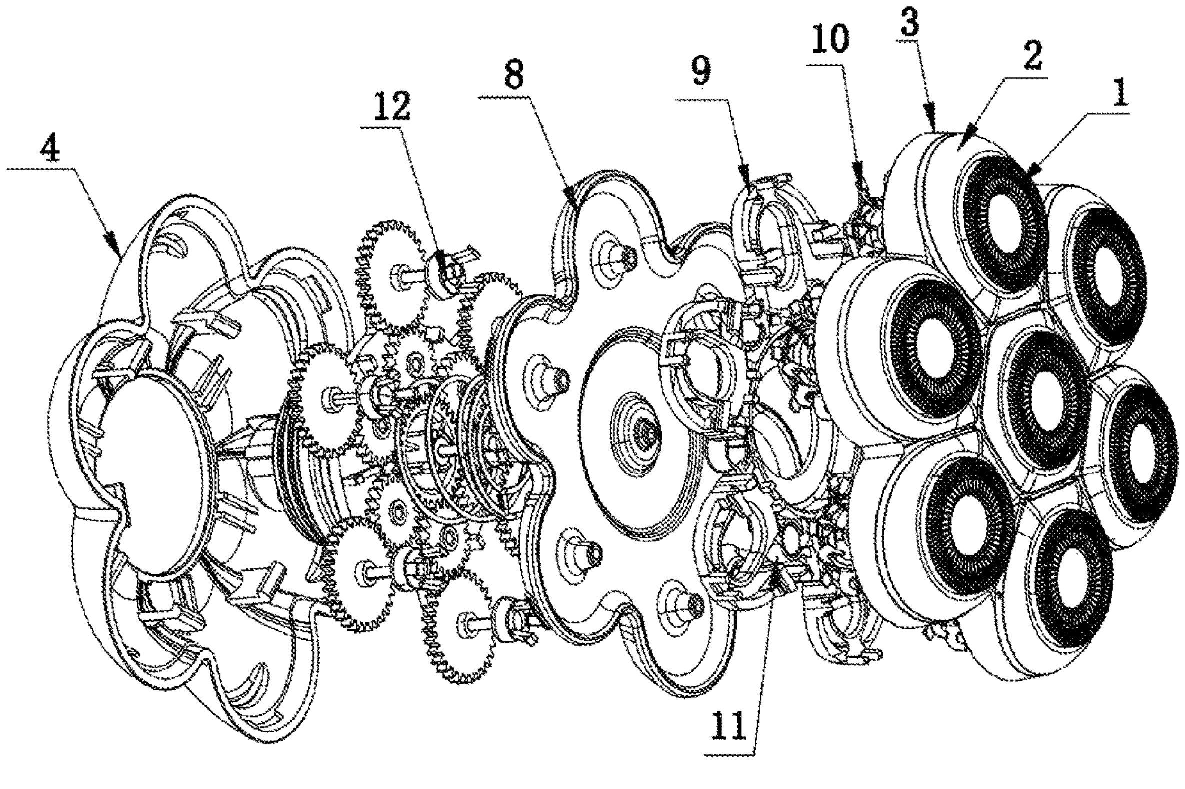
FIG. 4 is a second explosion schematic diagram according to the invention.
Figure 8:
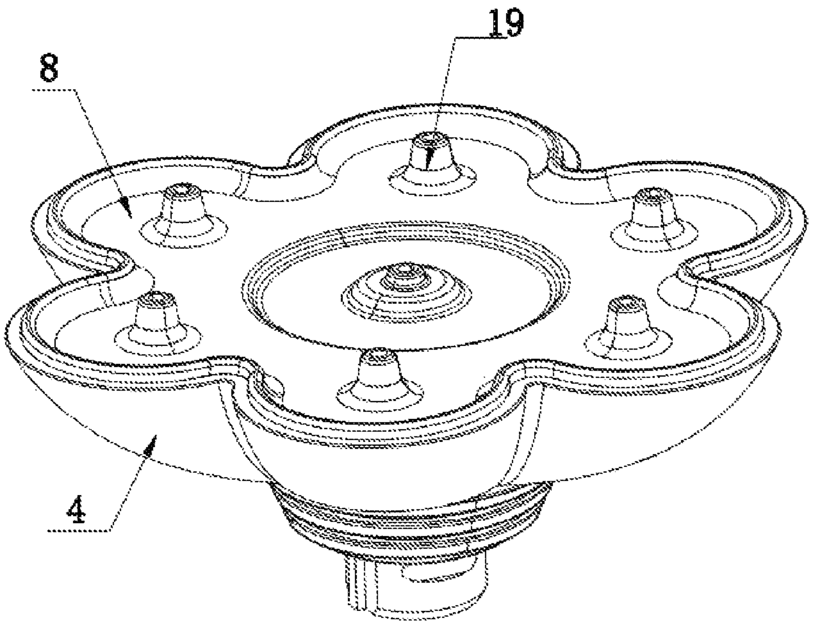
FIG. 8 is a schematic structural diagram of the bottom shell according to the invention.

As shown in FIG. 8, the bottom shell 4 is provided with a docking panel 8 on one side opposite to the cutter head assembly, and the docking panel 8 is provided with a boss 19 corresponding to the position of the cutter head assembly; the drive shafts of the gear driving mechanism all pass through the boss 19 and extend to the outside of the docking panel; after the cutter head assembly is disassembled relative to the bottom shell 4, the docking panel 8 of the bottom shell 4 will be exposed, and one end of the cutter head assembly will expose the driving part of the cutter head; during installation, position and assemble the docking panel 8 of the bottom shell 4 and the cutter head assembly, and then magnetically attract them to complete the installation;

as shown in FIGS. 3 and 4, a plurality of first magnetic grooves 13 are arranged annularly on the side of the docking panel 8 away from the cutter head assembly, and each of the first magnetic groove 13 is embedded with a first magnetic block; the docking panel 8 and the bottom shell 4 are assembled with each other.

Figure 5:
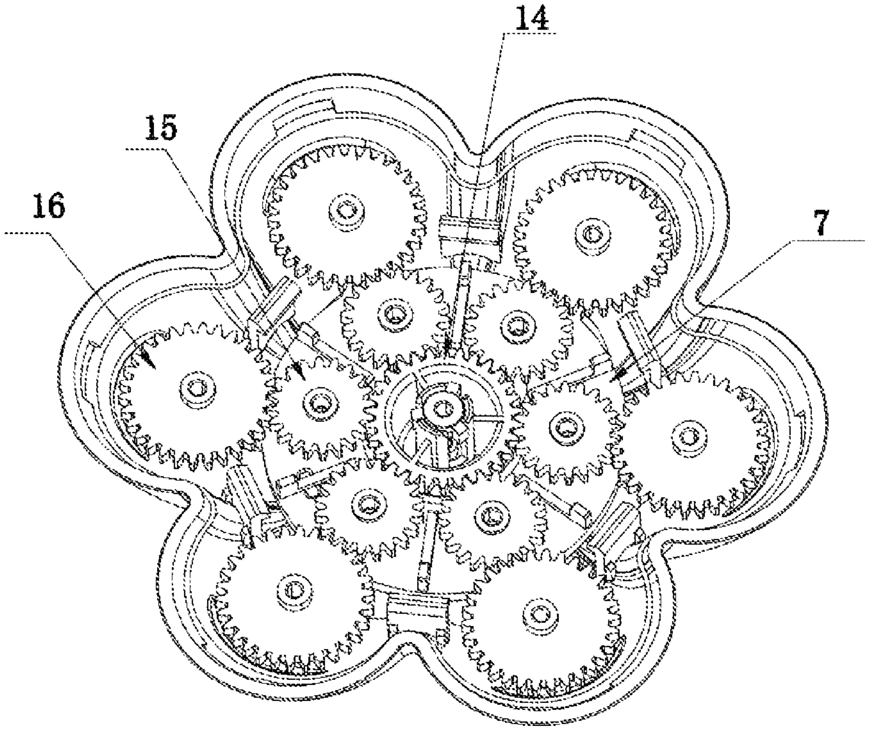
FIG. 5 is a schematic structural diagram of the gear transmission part according to the invention.

As shown in FIG. 5, the gear driving mechanism comprises a central driving wheel 14, transmission gears 15, and driven gears 16; the driven gears 16 are circumferentially arranged on a gear bracket 7 provided in the bottom shell 4; the central driving wheel 14 is installed at the center of the gear bracket 7, and the central driving wheel 14 is driven by a driving motor; one side of each of the driven gear 16 is driven by meshing with the central driving wheel 14 through the transmission gear 15, and each of the driven gear 16 and the central driving wheel 14 is provided with a drive shaft; the drive shaft passes through the docking panel 8 and is provided with a drive block 18, and each of the drive block 18 corresponds to a driving installation port of the cutter head assembly. When assembling, align the drive installation port of the cutter head assembly with the drive block 18 to complete the power connection. During operation, the driving motor rotates to drive the central driving wheel 14 to rotate, and the central driving wheel 14 rotates to drive each transmission gear 15 to rotate. The rotation of each transmission gear 15 drives the driven gear 16 to rotate, so the driven gear 16 and the central driving wheel 14 rotate together, thereby driving the drive shaft to rotate. After the drive shaft is connected to the cutter head assembly, each cutting blade of the cutter head assembly can be driven to rotate.

Figure 7:
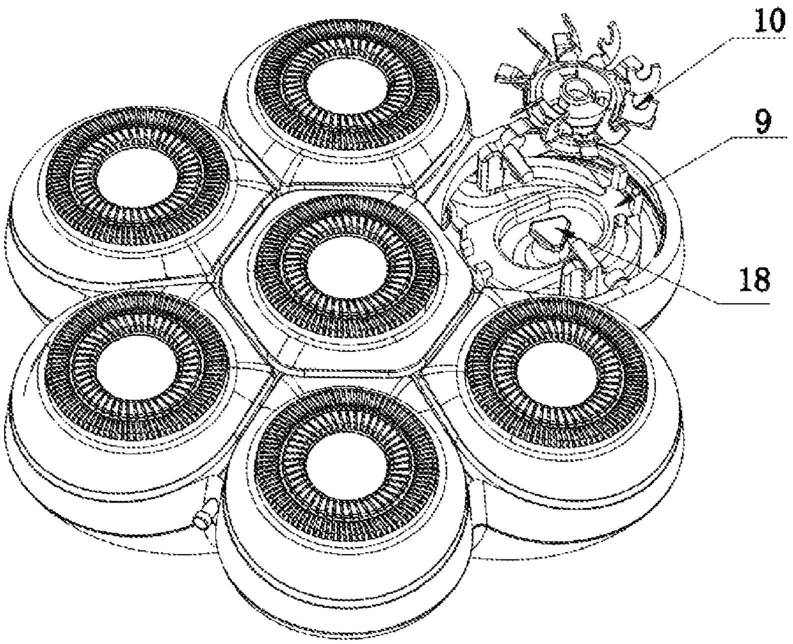
FIG. 7 is a partial exploded view of the cutting blade according to the invention.
Figure 10:
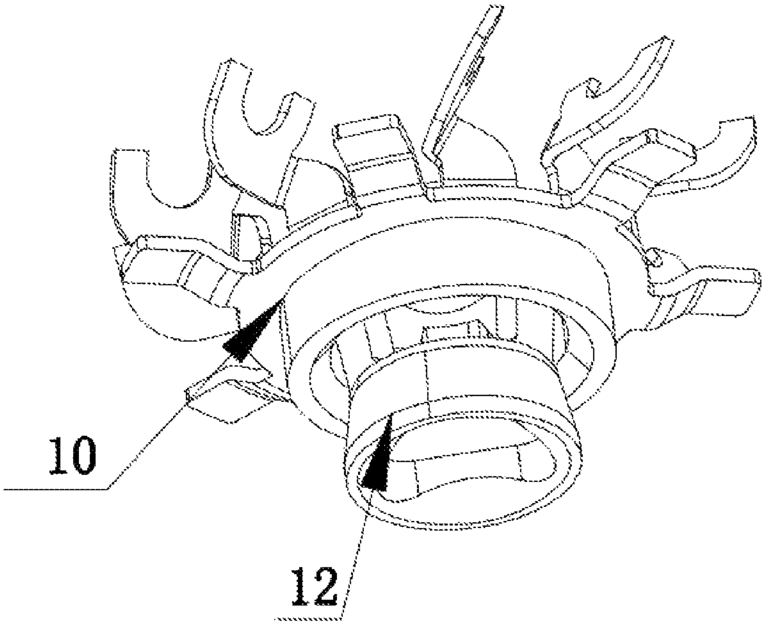
FIG. 10 is a schematic diagram of the assembly of the cutting blade and the connecting bracket according to the invention.

As shown in FIGS. 3, 4, and 10, the cutter head assembly comprises a face shell 3, fixing panels 2, cutter nets 1, cutting blades 10, elastic brackets 9, and connecting brackets 12; the elastic bracket 9 is installed in the face shell 3 and snap-connected to the face shell 3; the fixing panel 2 is installed on the face shell 3, and the cutter net 1 is installed on the fixing panel 2; the cutting blade 10 is arranged corresponding to each cutter net 1; the bottom of each of the cutting blade 10 is provided with a connecting bracket 12, and the driving installation port is formed at the bottom of the connecting bracket 12; after the cutter head assembly is assembled with the bottom shell 4, the driving block 18 is installed into the driving installation port and drives the cutting blade 10 to perform cutting action, as shown in FIG. 7;

the elastic bracket 9 is provided with a second magnetic groove 11 corresponding to each of the first magnetic groove 13, and the second magnetic groove 11 is embedded with a second magnetic block 17; the first magnetic block is magnetically attracted to the magnetic block 17 on the docking panel 8, and the elastic brackets 9 of several magnetic blocks 17 are provided with magnetic opening and closing members 6. After the cutter head assembly is assembled, the first magnetic block and the magnetic block 17 are aligned and magnetically attracted, so that the magnetic attraction between the cutter head assembly and the bottom shell 4 can be achieved. The first magnetic block and the magnetic block 17 can both be arranged in a circle, and there can be a sufficiently high magnetic attraction force between the first magnetic block and the magnetic block 17. Since there is a magnetic opening and closing member 6, when disassembling, just press the magnetic opening and closing member 6 to reduce the magnetic attraction force and facilitate the removal of the cutter head assembly.

As shown in FIGS. 6 and 9, the magnetic opening and closing member 6 passes through the through hole opened in the face shell 3 and extends into the face shell 3; the elastic bracket 9 is provided with a magnetic positioning hole at the position corresponding to the magnetic opening and closing member 6, and the magnetic opening and closing member 6 is inserted into the magnetic positioning hole and is arranged corresponding to one side of the magnetic block 17.

As shown in FIG. 9, each side of the magnetic block 17 relative to the magnetic opening and closing member 6 is provided with a positioning slot 20, and the magnetic opening and closing member 6 is buckled into the positioning slot 20.

The top of the positioning slot 20 is provided with an inclined guiding surface 21, and the head of the magnetic opening and closing member 6 is spherical and contacts the inclined guiding surface 21; a return spring is installed between each of the magnetic block 17 and the second magnetic groove 11; the bottom of the return spring is fixedly connected to the bottom surface of the second magnetic groove 11, the other end of the return spring is fixedly connected to the magnetic block 17; when the magnetic opening and closing member 6 is pressed, the magnetic block 17 moves toward the side away from the first magnetic block, and at this time the return spring is stretched, that is, the magnetic block 17 moves upward and further away from the first magnetic block. After the first magnetic block and the magnetic block 17 are far away, the magnetic attraction force can be reduced, so that the cutter head assembly can be separated and removed better.

Figure 2:
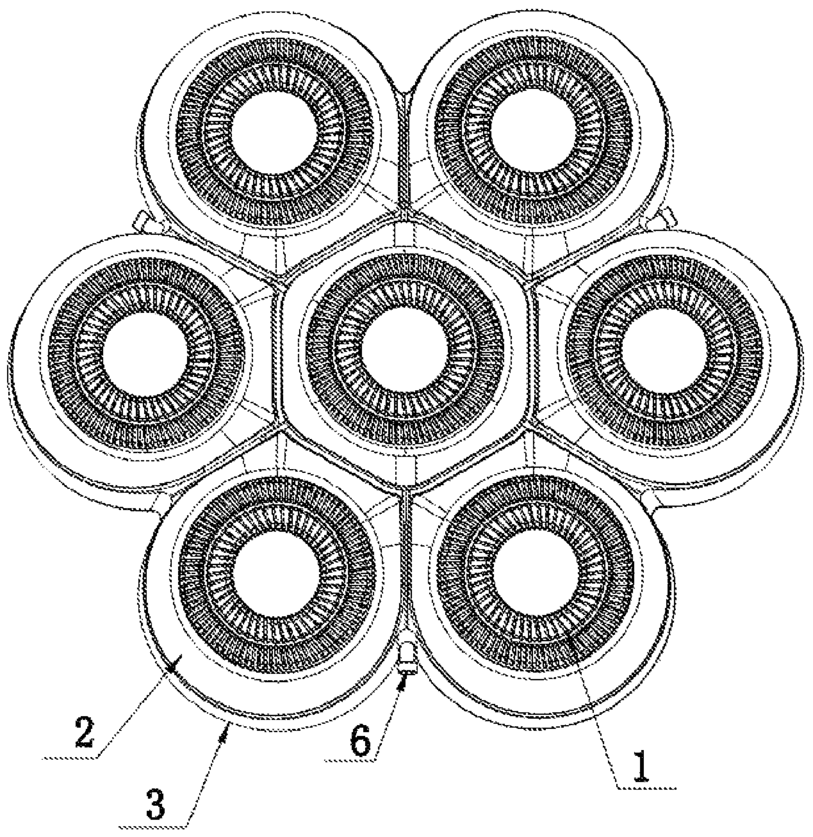
FIG. 2 is a top view of the invention.

In the embodiment, as shown in FIG. 2, the magnetic opening and closing members 6 are provided to be three, and the number of the magnetic opening and closing members 6 is smaller than the number of the magnetic blocks 17; the magnetic opening and closing members 6 are arranged in a triangular shape in the groove opened outside the face shell 3. During operation, use thumb, index finger and middle finger to buckle into the corresponding grooves in a triangular shape, and then press down on the magnetic opening and closing member 6, so that the first magnetic block can be moved away from the second magnetic block 17, and the cutter head assembly can be removed at this time.

The above are only specific embodiments of the invention, but the protection scope of the invention is not limited thereto. Any modifications or substitutions creative efforts shall all fall within protection scope of the invention. Therefore, the protection scope of the invention should be subject to the protection scope defined by the claims.

What is claimed is:

1. A magnetic shaver, comprising:

a connecting part (5);

a bottom shell (4), wherein the bottom shell (4) is installed on the connecting part (5); the connecting part (5) and the bottom shell (4) are provided with a gear driving mechanism;

a cutter head assembly, wherein the cutter head assembly is magnetically connected and assembled with the bottom shell (4) through a magnetic structure; when the cutter head assembly is installed on the bottom shell (4), the gear driving mechanism drives the cutter head assembly;

magnetic opening and closing members (6), which are separately arranged on the outer circumferential surface of the cutter head assembly; when it is necessary to remove the cutter head assembly, press the magnetic opening and closing members (6), or directly manually separate the cutter head assembly from the bottom shell.

2. The magnetic shaver according to claim 1, wherein the bottom shell (4) is provided with a docking panel (8), and the docking panel (8) is provided with a boss (19) corresponding to the position of the cutter head assembly; drive shafts of the gear driving mechanism all pass through the boss (19) and extend beyond the docking panel (8);

a plurality of first magnetic grooves (13) are arranged annularly on the side of the docking panel (8) away from the cutter head assembly, the docking panel (8) and the bottom shell (4) are assembled with each other.

3. The magnetic shaver according to claim 2, wherein the gear driving mechanism comprises a central driving wheel (14), transmission gears (15), and driven gears (16); the driven gears (16) are circumferentially arranged on a gear bracket (7) provided in the bottom shell (4); the central driving wheel (14) is installed at the center of the gear bracket (7), and the central driving wheel (14) is driven by a driving motor; one side of each of the driven gears (16) is driven by meshing with the central driving wheel (14) through a corresponding one of the transmission gears (15), and each of the driven gears (16) and the central driving wheel (14) are each provided with a drive shaft; the drive shaft passes through the docking panel (8) and is provided with a drive block (18), and each of the drive blocks (18) corresponds to a driving installation port of the cutter head assembly.

4. The magnetic shaver according to claim 3, wherein the cutter head assembly comprises a face shell (3), fixing panels (2), cutter nets (1), cutting blades (10), elastic brackets (9), and connecting brackets (12); each of the elastic brackets (9) is installed in the face shell (3) and snap-connected to the face shell (3); each of the fixing panels (2) is installed on the face shell (3), and each of the cutter nets (1) is installed on a corresponding one of the fixing panels (2); each of the cutting blades (10) is arranged corresponding to a respective one of the cutter nets (1); the bottom of each of the cutting blades (10) is provided with connecting brackets (12), and the driving installation port is formed at the bottom of the connecting bracket (12); after the cutter head assembly is assembled with the bottom shell (4), a corresponding one of the driving blocks (18) is installed into the driving installation port and drives the cutting blade (10) to perform cutting action;

the elastic bracket (9) is provided with a second magnetic groove (11) corresponding to each of the first magnetic grooves (13), and the second magnetic groove (11) is embedded with a magnetic block (17).

5. The magnetic shaver according to claim 4, wherein each side of the magnetic block (17) relative to the magnetic opening and closing member (6) is provided with a positioning slot (20), and the magnetic opening and closing member (6) is buckled into the positioning slot (20).

6. The magnetic shaver according to claim 5, wherein a top portion of the positioning slot (20) is provided with an inclined guiding surface (21).

* * * * *